(12) United States Patent
Cline et al.

(10) Patent No.: US 7,765,704 B2
(45) Date of Patent: Aug. 3, 2010

(54) METHOD OF ALIGNING PROPERTIES FOR DYNAMOMETER TESTING

(75) Inventors: Michael R. Cline, Royal Oak, MI (US); Robert W. Regener, Macomb Township, MI (US); Dennis P. Klinkhamer, Harrison Township, MI (US); Clary L. Laffin, West Bloomfield, MI (US); Dennis A. McLeod, Rochester, MI (US); Jayasri R. Chari, Fenton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 85 days.

(21) Appl. No.: 12/177,443

(22) Filed: Jul. 22, 2008

(65) Prior Publication Data

US 2010/0018300 A1 Jan. 28, 2010

(51) Int. Cl.
*G01C 15/00* (2006.01)
*G01B 11/27* (2006.01)

(52) U.S. Cl. ...................................................... 33/286
(58) Field of Classification Search ................... 33/286, 33/228, 288, 608
See application file for complete search history.

(56) References Cited

U.S. PATENT DOCUMENTS

| | | | | |
|---|---|---|---|---|
| 4,226,530 A | * | 10/1980 | Broom | 356/121 |
| 4,454,659 A | * | 6/1984 | Eck | 33/288 |
| 4,598,481 A | * | 7/1986 | Donahue | 33/288 |
| 4,615,618 A | * | 10/1986 | Bailey et al. | 356/139.09 |
| 4,691,443 A | * | 9/1987 | Hamilton et al. | 33/288 |
| 5,515,613 A | * | 5/1996 | Hinson | 33/288 |
| 6,598,308 B1 | * | 7/2003 | Johansson et al. | 33/608 |
| 6,725,551 B1 | * | 4/2004 | Sutton | 33/286 |
| 6,931,738 B2 | * | 8/2005 | Bodgren et al. | 33/286 |
| 2006/0042105 A1 | * | 3/2006 | McGrail et al. | 33/286 |

* cited by examiner

*Primary Examiner*—Christopher W Fulton
(74) *Attorney, Agent, or Firm*—Quinn Law Group, PLLC (57) ABSTRACT

A method of aligning a property for testing in a dynamometer cell is provided, including the steps of: mounting a laser travel car to each of four risers in a repositionable manner; mounting a laser to each of the laser travel cars in a repositionable manner; securing a dyno cart into a cart receiving station between the four risers; calibrating each of the lasers; preparing the dyno cart to receive the property; mounting the property to the dyno cart; orienting the various lasers based, at least in part, upon predetermined optimal alignment dimensions to thereby provide a set of target locations; orienting the property such that predetermined locations of the property align with the set of target locations to ensure appropriate property orientation during testing; and removing the dyno cart from the cart receiving station for delivery to the dynamometer cell.

18 Claims, 3 Drawing Sheets

METHOD OF ALIGNING PROPERTIES FOR DYNAMOMETER TESTING

TECHNICAL FIELD

The present invention relates generally to apparatuses for testing mechanical power sources, and more specifically to methods of preparing motor and engine assemblies for transportation to and testing in dynamometer cells.

BACKGROUND OF THE INVENTION

Original equipment manufacturers (OEM) of high quality mechanical power sources, such as motors, engines, and other prime movers, almost invariably test the power source prior to releasing the same for sale to ensure that it performs properly and up to its rated capability. Dynamometer testing apparatuses (or "dyno" for short) of various types are used to determine the performance characteristics of motor and engine assemblies, transmissions, and of vehicles powered by such motors and engine assemblies. A dyno can be used, for example, to measure the torque and rotational speed from which power produced by an internal combustion engine can be calculated.

In the case of internal combustion engine assemblies, testing is often done on a large scale basis where testing is performed in a continuous manner on a variety of different types of engines at any one point in time at a single test facility. Test engineers and technicians often use a dressing area which allows the engines to be prepped or "dressed" prior to entering the engine test cell (e.g., engine dynamometer room). As a further means of facilitating the testing process and minimizing the down time of the dynamometer room, a test operator often may use engine transport systems to expedite the preparation and delivery of the engine to the dynamometer room.

According to prior practices, "dressing an engine" generally consists of fixing the engine assembly to a box-shaped tubular frame assembly that rests directly on the base of the staging area. An adapter may then be connected to the tubular frame assembly for mounting the electrical and mechanical umbilical interfaces thereto. A transmission adapter extension plate may also be connected to the engine at this time for facilitating the testing of a corresponding power transmission device. Once the engine is properly dressed, the engine and tubular frame must be moved to the dynamometer room. Conventionally, this step has been accomplished by connecting the box frame to an overhead crane which, with the assistance of an operator, transfers the dressed engine to the dynamometer room. Another conventional manner of transporting the engine assembly is via a wheeled pallet assembly or "dyno cart" which attaches to the tubular frame assembly and supports the engine during dressing, and can thereafter deliver it to a dynamometer room where the pallet assembly works in conjunction with a pallet locating system.

In many of the abovementioned testing environments, the efficiency, reliability, and throughput of the individual testing cells is highly dependent upon the accuracy and dependability of the interconnection between the testing apparatus and the "property" (e.g., engine) being tested. As such, most OEM testing facilities put a premium on simple, rapid, and reliable means for connecting the property being tested to the dynamometer unit. Under less than optimal circumstances, there is a recognizable possibility that errors may be made in connecting the testing equipment to the power source, which may produce conditions detrimental to the accuracy and integrity of the equipment, as well as the proper performance of the engine.

SUMMARY OF THE INVENTION

The present invention reduces the effort and inefficiencies of current carting processes, breaking from current practices of aligning properties for dynamometer testing by utilizing a laser based carting cell, which integrates mechanical details to scan features of the properties with lasers. The mechanical details of the carting cell create a four-sided envelope within which the property can be hoisted, mounted, scanned and aligned in an efficient and accurate fashion. For the process, carts, jigs, and end-effectors are pre-assembled inside the carting cell envelope to locations determined by data provided through 3-d modeling. A dyno cart is introduced to the laser carting cell where the property (e.g., engine, transmission, engine and transmission assembly, etc.) can be hoisted and thereafter attached. Targets will be located on the property based on modeled data to precision-locate the property relative to the cart datum. Through the integration of a number of stanchions, jacks, and other mechanisms, the property may be adjusted to pre-specified target locations in space that will ensure appropriate orientation for testing.

It is expected that the present invention will reduce the time taken to properly mount properties on carts for engagement within dynamometer cells. Where extensive adjustments have traditionally been made with cryptic tools, the present invention will enable setups of much shorter duration, wherein precision alignments are carried out using jacks and end-effectors, with the aid of lasers, scales, and other features. The cart and property may then be moved as a single assembly to a dynamometer cell.

Special test requirements for the location, pitch, and yaw of the property may be introduced during the carting activity, enabled through the present invention, so that special in-vehicle conditions may be replicated during testing. By incorporating appropriate mathematical data into the alignment process and incorporating the present invention, vehicular operating conditions may be simulated prior to the matching of the property to the dyno cell. This affords broader functionality and scope for the test process. The present invention also eliminates the need for re-orientation in the dynamometer cell, reducing non-value added time to the test process.

According to one embodiment of the present invention, a method of aligning a property for testing in a dynamometer cell is provided, including the following steps: orienting two or more lasers based, at least in part, upon predetermined optimal alignment dimensions (i.e., math data provided through 3-d modeling) to thereby provide a set of target locations; and orienting the property such that predetermined locations of the property align with the individual target locations to ensure appropriate property orientation during testing. In this particular instance, the method of aligning a property may be practiced inside of a testing cell or at a separate staging location. As used herein, the term "property" should be interpreted or defined to mean an assembly which includes, at a minimum, at least one of an engine, a motor, and a transmission.

Prior to orienting the lasers, a corresponding number of laser travel cars are preferably mounted in a repositionable manner. A respective one of the lasers is mounted to each of the laser travel cars, and each of the lasers is thereafter calibrated. Contemporaneously therewith, a dyno cart is secured into a carting cell receiving station. The dyno cart is then prepped to receive the property; the property thereafter being mounted to the dyno cart; and, after the property is properly aligned, the dyno cart is removed from the cart receiving station for delivery to the dynamometer cell. Ideally, the receiving station includes a receiving portion that is almost identical to a receiving portion inside the dynamometer cell that is configured to mate with, receive, and secure the dyno cart.

According to one aspect of the present embodiment, positioning the travel cars includes: attaching one of the travel cars to a first riser; and attaching the other of the two or more travel cars to a second riser. In this instance, the second riser is generally perpendicularly oriented with respect to the first riser.

According to another aspect of the present embodiment, orienting the various lasers includes: positioning the laser mounted to the first riser at a first position such that a laser beam emitted therefrom creates a first target point; and positioning the laser mounted to the second riser at a second position such that a laser beam emitted therefrom creates a second target point. To this regard, the set of target locations is defined, at least in part, by the first and second target points.

According to yet another aspect, mounting the lasers to their respective travel cars includes: attaching a height gauge to each of the laser travel cars in a vertically repositionable manner; mounting a laser adapter to each of the height gauges; and attaching a respective one of the lasers to each of the laser adapters.

According to yet another aspect, calibrating the lasers includes: attaching a first scale to the first riser; attaching a second scale to the dyno cart substantially parallel to the first scale; and, orienting the laser mounted to the first riser such that a laser beam emitted therefrom crosses the first scale at a first point and the second scale at a second point, wherein the first and second points are of equal distances from respective ends of the first and second scales. Calibrating the lasers preferably also includes: attaching a third scale to the second riser; attaching a fourth scale to the dyno cart substantially parallel to the third scale; and, orienting the laser mounted to the second riser such that a laser beam emitted therefrom crosses the third scale at a third point and the fourth scale at a fourth point, wherein the third and fourth points are of equal distances from respective ends of the third and fourth scales. Finally, an absolute zero height position is established for all of the lasers.

According to another aspect of the present embodiment, preparing the dyno cart to receive the property preferably includes: attaching one or more cross beams to the dyno cart at a position based, at least in part, upon the predetermined optimal alignment dimensions; setting one or more support elements (e.g., stanchions, jacks, etc.) to a predetermined height based, at least in part, upon the predetermined optimal alignment dimensions; attaching each of the support elements to one of the cross beams at a position based, at least in part, upon the predetermined optimal alignment dimensions. In addition, an engine mount is attached to each of the support elements and positioned based, at least in part, upon the predetermined optimal alignment dimensions.

According to yet another aspect of the present embodiment, mounting the property to the dyno cart includes: positioning the property such that it is generally vertically adjacent to the support elements; orienting the property relative to the dyno cart based, at least in part, upon the predetermined optimal alignment dimensions; and mounting the property to the various engine mounts.

According to another embodiment of the present invention, a method of carting a property for testing in a dynamometer cell is provided, including the steps of: mounting a plurality of laser travel cars in a repositionable manner; mounting at least one laser to each of the laser travel cars in a repositionable manner; securing a dyno cart into a cart receiving station; calibrating the lasers; preparing the dyno cart to receive the property; mounting the property to the dyno cart; orienting the lasers based, at least in part, upon predetermined optimal alignment dimensions to thereby provide a set of target locations; and orienting the property such that predetermined locations of the property align with the set of target locations to ensure appropriate property orientation during testing.

According to one aspect of the present embodiment, positioning the various travel cars includes: attaching a first travel car to a first riser; attaching a second travel car to a second riser; attaching a third travel car to a third riser; and attaching a fourth travel car to a fourth riser. The first, second, third and fourth risers are positioned relative to one another to thereby create a four-sided envelope therebetween.

According to another aspect of the present embodiment, orienting the lasers includes: positioning a first laser at a first position relative to the first riser such that a laser beam emitted therefrom creates a first target point; positioning a second laser at a second position relative to the second riser such that a laser beam emitted therefrom creates a second target point; positioning a third laser at a third position relative to the third riser such that a laser beam emitted therefrom creates a third target point; and positioning a fourth laser at a fourth position relative to the fourth riser such that a laser beam emitted therefrom creates a fourth target point. Accordingly, the set of target locations is defined, at least in part, by the first, second, third and fourth target points.

According to yet another aspect of the present embodiment, calibrating the lasers includes: attaching a first scale to the first riser; attaching a second scale to the second riser; attaching a third scale to the third riser; attaching a fourth scale to the fourth riser; attaching fifth and sixth scales at laterally opposing sides of the dyno cart, and seventh and eighth scales at longitudinally opposing sides of the dyno cart; orienting the first and second lasers such that a laser beam emitted therefrom respectively crosses the first or second scales, and the fifth and sixth scales at a respective point, the respective points being at equal distances from respective ends of the first or second, and fifth and sixth scales; and, orienting the third and fourth lasers such that a laser beam emitted therefrom respectively crosses the third or fourth scales, and the seventh and eighth scales at a respective point, the respective points being at equal distances from respective ends of the third or fourth, seventh and eighth scale.

The above features and advantages, and other features and advantages of the present invention, will be readily apparent from the following detailed description of the preferred embodiments and best modes for carrying out the present invention when taken in connection with the accompanying drawings and appended claims.

DESCRIPTION OF THE PREFERRED EMBODIMENTS

Figure 1:
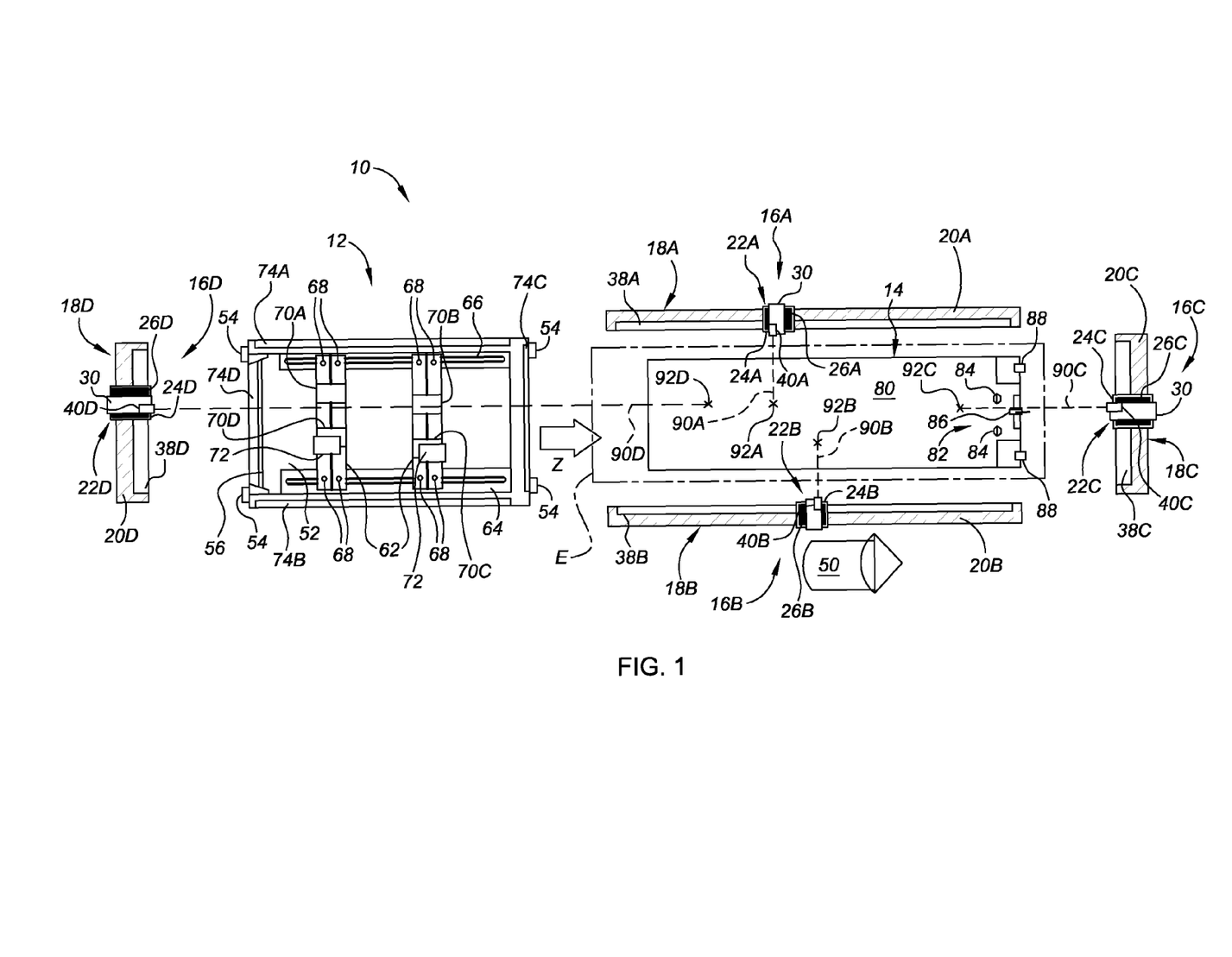
FIG. 1 is a plan-view schematic illustration of a representative laser carting cell for practicing the methods of the present invention.
Figure 2:
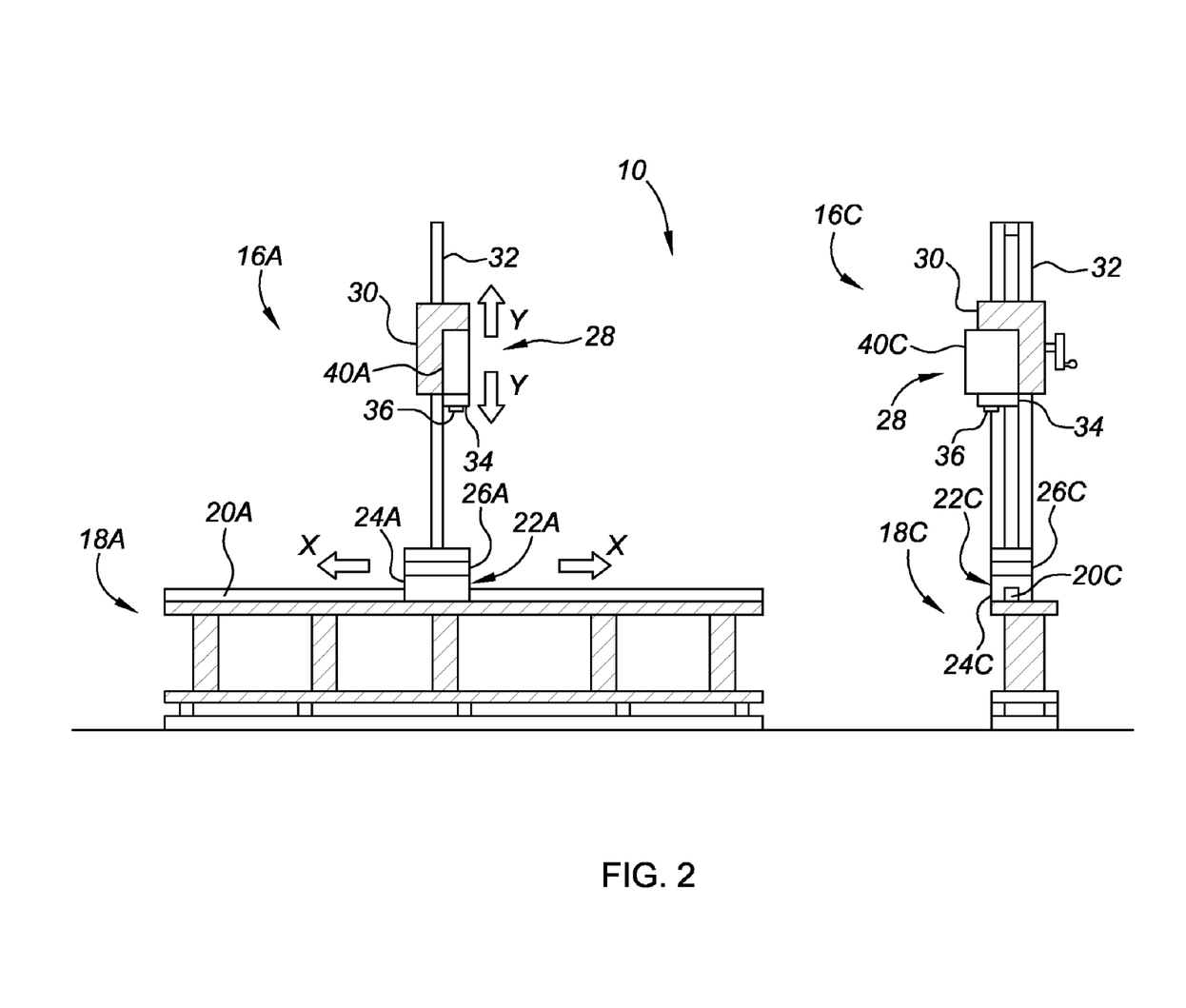
FIG. 2 is a side-view schematic illustration of a portion of the laser carting cell of FIG. 1.

Referring to the drawings, wherein like reference numbers refer to like components throughout the several views, FIG. 1 is a schematic illustration of a staging or dressing area, which is identified generally as 10 and referred to hereinafter as "laser carting cell", with which the present invention may be utilized. The embodiments of the present invention will be described herein with respect to the laser carting cell 10 of FIG. 1 as an exemplary application by which the present invention may be practiced. It should be readily understood that the present invention is by no means limited to the particular arrangement of FIG. 1. In addition, the drawings presented herein—i.e., FIGS. 1 and 2, are not to scale and are provided purely for explanatory purposes. Thus, the specific and relative dimensions shown in the drawings are not to be considered limiting.

As seen in FIG. 1, the laser carting cell 10 consists primarily of a wheeled pallet assembly or "dyno cart" 12, a receiving station 14, and a plurality of mechanical details, defined herein as first, second, third and fourth laser stations 16A, 16B, 16C and 16D, respectively. Each laser station 16A, 16B, 16C, 16D includes a respective riser or platform 18A, 18B, 18C and 18D having a rail portion 20A, 20B, 20C and 20D (more clearly illustrated in FIG. 2) elongated in a linear fashion along a respective upper surface thereof. The laser stations 16A, 16B, 16C, 16D, namely first, second, third and fourth risers 18A, 18B, 18C and 18D, are positioned relative to one another to thereby create a four-sided envelope therebetween (indicated for illustration purposes with hidden box E), and within which a property can be hoisted, mounted, scanned and aligned in an efficient, timely, and accurate fashion. With this said, the design (e.g., length, width, height, geometry, etc.) and arrangement (e.g., square, rectangular, elliptical, etc.) of the laser stations 16A, 16B, 16C, 16D may be individually or collectively varied so long as the four-sided envelope E is maintained. Moreover, it is plausible to eliminate the risers 18A, 18B, 18C, 18D altogether, and create the four-sided envelope E by elongating the rail portions 20A, 20B, 20C, 20D along the floor of the carting cell 10.

As will be described in extensive detail hereinbelow, each of the rail portions 20A, 20B, 20C, 20D is configured to mate with and receive a respective laser travel car 22A, 22B, 22C and 22D, mounted thereon in a repositionable (i.e., slidable) manner. In other words, the first laser travel car 22A, for example, includes a plurality of rollers (not shown herein) that mate with laterally opposing surfaces of the first rail portion 20A such that the first laser travel car 22A may be selectively linearly positioned and, ideally, repositioned at various locations along the first riser 18A (illustrated by arrows X in FIG. 2). Moreover, a locking mechanism may be integrated into each laser travel car 22A, 22B, 22C, 22D to provide a more rigid and secure placement along the risers 18A, 18B, 18C, 18D.

Looking at both FIGS. 1 and 2, the laser travel cars 22A, 22B, 22C, 22D respectively include first, second, third and fourth body portions 24A, 24B, 24C and 24D configured for slidably mating with a corresponding rail portion 20A, 20B, 20C, 20D. First, second, third and fourth height gauge adaptors 26A, 26B, 26C and 26D are attached to an upper surface of a respective body portion 24A, 24B, 24C and 24D. Each of the height gauge adaptors 26A, 26B, 26C, 26D is designed to receive and connect with a height gauge assembly 28, two of which are shown in FIG. 2. According to preferred practices, each height gauge assembly 28 includes an electronic gauge with digital readout, indicated collectively with reference numeral 30, that is slidably attached to and preferably vertically repositionable along (illustrated by arrows Y in FIG. 2) a gauge tower 32. However, the height gauges assemblies 28 may be purely mechanical devices (e.g., a vernier height gauge), or any combination of electronic and mechanical height gauges, without departing from the intended scope of the present invention.

Attached to each of the electronic gauges 30 is a laser adaptor 34 (FIG. 2) that attaches to and supports one of a plurality of electronic-optical devices that is configured to emit a low-divergence light beam. According to a preferred embodiment of the present invention, first, second, third and fourth lasers 40A, 40B, 40C and 40D, respectively, are employed by a respective height gauge assembly 28, as depicted in FIG. 1. Each laser 40A, 40B, 40C, 40D may be securely attached to a complementary adaptor 34 by, for example, thumb screws 36. Finally, first, second, third and fourth scales 38A, 38B, 38C and 38D, respectively, are attached to a corresponding riser 18A, 18B, 18C, 18D, adjacent to the rail portion 20A, 20B, 20C, 20D. The scales 38A, 38B, 38C, 38D may be traditional mechanical devices used to measure distances (e.g., a metric ruler), digital gauges, or a combination thereof.

Looking back to FIG. 1, the laser carting cell 10 also includes a wheeled pallet assembly or "dyno cart" 12 that is configured to support, accurately position, transport, and maintain a "property" 50 during testing in a dynamometer cell (not shown). As used herein, the term "property" should be interpreted or defined to mean an assembly which includes, at a minimum, at least one of an engine, a motor, and a transmission. By way of example, the property 50 may consist of an internal combustion engine (ICE) assembly, an ICE connected to a corresponding power transmission assembly, a hybrid-type powertrain (e.g., one or more motor/generator devices and an ICE assembly in power flow communication with a power transmission), etc. Moreover, it should be recognized that the functionality of the present invention is not limited in scope to the motive power devices as embodied herein. To this regard, existing technological devices, such as fuel cells, as well as those yet to be contrived will benefit from the invention disclosed herein. It is also conceivable, as will be described below with respect to FIG. 3, to eliminate the dyno cart 12, and practice the present invention inside of a test cell (e.g., engine dynamometer room).

The fundamental components of the dyno cart 12 include a base plate 52, a plurality of preferably pivotable and lockable wheel assemblies 54, and a handle 56 that is positioned along one of the four sides of the base plate 52. It should be appreciated by those skilled in the art that the dyno cart 12 and its various constituent components—i.e., base plate 52, wheels 54, and handle 56, can be made out of any material suitable for the intended use of the dyno cart 12 (e.g., steel, aluminum, plastic, composite materials, and any combination thereof). However, steel is preferred; and, if necessary, the steel may be pretreated with an anti-corrosive coating.

The dyno cart 12 also includes at least one, but preferably two or more cross beams 62 that may be selectively positioned and, preferably, repositioned along the base plate 52. For example, the cross beams 62 of FIG. 1 are slidably mounted to first and second laterally spaced cart side rails 64 and 66, respectively, and attachable thereto in a rigid manner (e.g., via T-bolts 68). The individual cross beams 62 are designed to mate with and buttress one or more support elements, defined herein by first, second, third and fourth stanchions 70A, 70B, 70C and 70D. Each stanchion 70A, 70B, 70C, 70D has a selectively adjustable height (e.g., includes a support arm which telescopes with respect to a tubular base portion). The individual stanchions 70A, 70B, 70C, 70D can be of equal or varying sizes and gauges, depending upon the particular property 50 being tested. The stanchions 70A, 70B, 70C, 70D are configured to mate with a complementary engine mount, two of which are illustrated in FIG. 1 and identified with reference numerals 72. Finally, fifth, sixth, seventh and eighth scales 74A, 74B, 74C and 74D, respectively, are attached to the dyno cart 12, along the four sides of base plate 52. The scales 74A, 74B, 74C, 74D may be traditional mechanical devices used to measure distances (e.g., a metric ruler), digital gauges, or a combination thereof.

The laser carting cell 10 also includes a receiving station 14. In the particular laser carting cell configuration presented in FIG. 1, the receiving station 14 consists essentially of a bed plate 80 with a receiving portion, indicated generally by reference numeral 82, at one end thereof. The receiving portion 82 is designed to resemble a receiving apparatus from inside of a typical dynamometer testing cell that is configured to mate with, receive, and secure the dyno cart 12 during testing according to prescribed zero point datums. For instance, the receiving portion 82 of FIG. 1 includes a pair of substantially identical cart stops 84, a lever apparatus 86 for drawing the cart 12 into a lockable position, and a pair of substantially identical locking mechanisms 88 for locking the dyno cart 12 into place.

Figure 3:
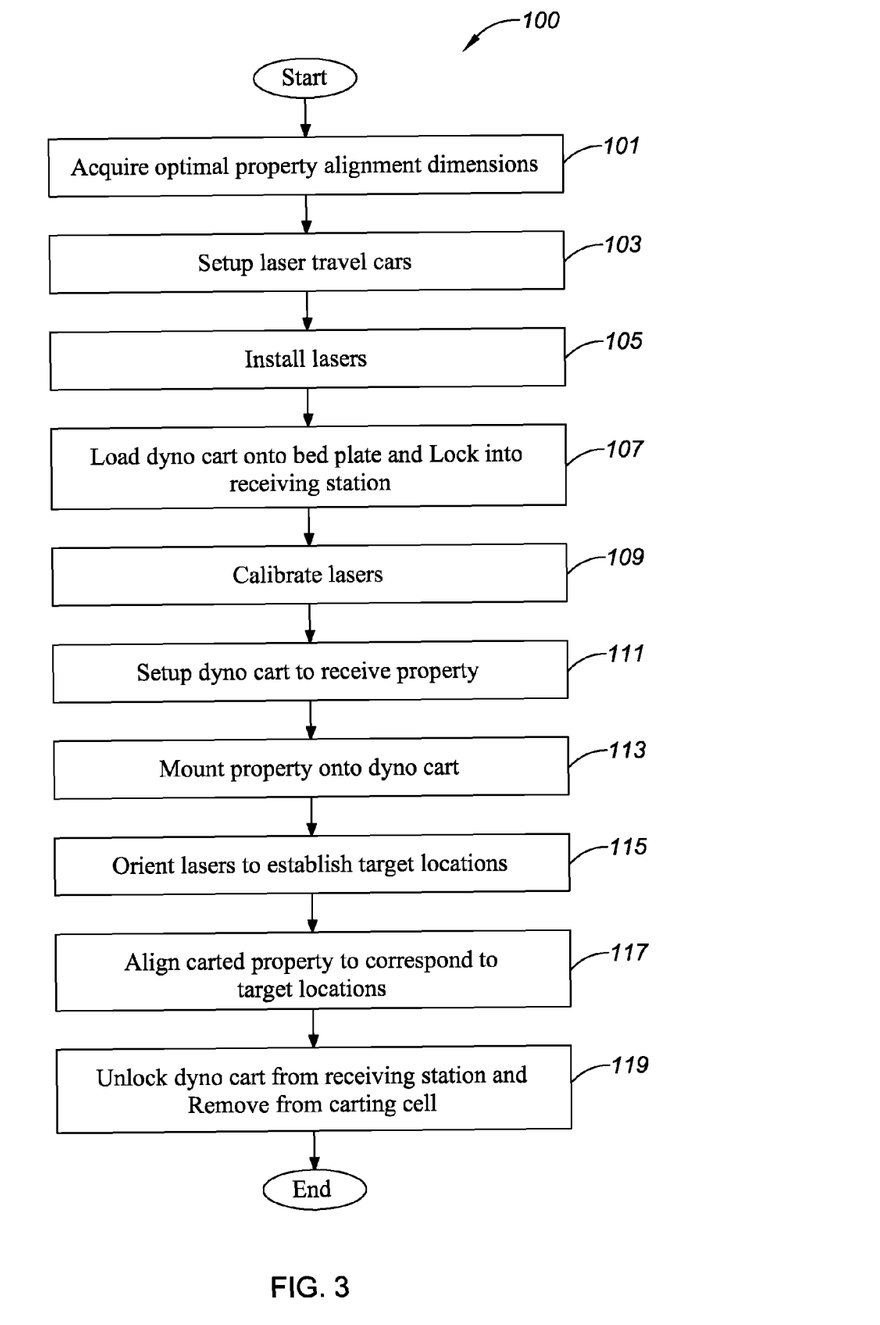
FIG. 3 is a block diagram or flow chart illustrating a method of aligning properties for dynamometer testing in accordance with a preferred embodiment of the present invention.

With reference now to the flow chart in FIG. 3, a procedure for prepping a property for testing, namely a method of aligning and/or carting an internal combustion engine assembly is shown generally as 100 in accordance with the present invention. The method 100 is described herein with respect to the structure illustrated in FIGS. 1 and 2. The present invention, however, may also be employed in other carting cells, and used for carting or aligning various other types of properties. The method 100 of the present invention preferably includes at least steps 101-119. However, it is within the scope and spirit of the present invention to omit steps, include additional steps, and/or modify the order presented in FIG. 3. It should be further noted that the method 100 depicted in FIG. 3 represents a single operation in aligning and/or carting a property. As such, it is contemplated, but not required, that the method 100 be applied in a systematic and repetitive manner.

The method 100 begins with step 101, in which the necessary math data (referred to hereinafter as the "optimal property alignment dimensions") is acquired for aligning and carting the property 50. For example, available math models of the property 50 (e.g., ICE assembly, engine and transmission assemblies), along with generated math models of the various support elements (e.g., cross beams 62, stanchions 70A-70D, etc.) and the dynamometer cart 12, are integrated into a computer-aided-drafting program (CAD) to place the engine model on the cart model in the optimal test position. Dimensions from the cart rails 64, 66, through the engine mounts 72, to complementary mounting points on the property 50 dictate the proper support elements to be selected and added to the assembly model. Pre-established testing dimensions are then incorporated into the math model, which generates the necessary placement and height of the support elements, along with a final set of dimensions ("optimal property alignment dimensions") for verifying that the property 50 is in the proper position for testing.

Prior to, contemporaneously with, or after step 101, the laser travel cars 22A-22D are setup in the laser carting cell 10 in step 103. In general, step 103 includes: slidably attaching the first laser travel car 22A to the first riser 18A (i.e., rail portion 20A); slidably attaching the second laser travel car 22B to the second riser 18B (i.e., rail portion 20B); slidably attaching the third laser travel car 22C to the third riser 18C (i.e., rail portion 20C); and slidably attaching the fourth laser travel car 22D to the fourth riser 18D (i.e., rail portion 20A). Thereafter, the gauge adaptors 26A-26D are secured to their respective body portions 24A-24D.

The first, second, third and fourth lasers 40A-40D are then installed in step 105. To install the lasers 40A-40D, the height gauge assemblies 28 are adjustably attached to their respective travel cars 22A-22D. Specifically, a tower 32 with electronic gauge and digital readout 30 is secured to each gauge adaptor 26A-26D. A laser adaptor 34 is then fixed to each electronic gauge 30. Finally, a laser 40A-40D is then attached to each laser adaptor 34 (e.g., via thumb screws 36). It should be recognized that the electronic gauge 30, laser adaptor 34, and laser can be fabricated as a single unit, thereby eliminating some of the actions noted above.

At any time during steps 101 through 105, the dyno cart 12 is loaded into the laser carting cell 10 at step 107. According to the preferred embodiment, the dyno cart 12 is pushed onto the bed plate 80 until a forward end thereof presses or abuts against cart stops 84. Contemporaneously, a rear locator (not shown) on the receiving station 14 engages to provide angular alignment of the cart dyno 12, while locating rollers (not visible in the Figures) mount rails in the receiving station 14 to ensure height repeatability. The center lever 86 is then rotated in an upward motion, drawing the dyno cart 12 into a mating position with locking mechanisms 88. The dyno cart 12 is thereafter securely locked into the receiving station 14 via locking mechanisms 88.

With continuing reference to FIG. 3, the method 100 also includes, as step 109, calibrating the lasers. According to preferred practices, calibrating the lasers 40A-40D includes, in part: attaching the first scale 38A to the first riser 18A; attaching the second scale 38B to the second riser 18B; attaching the third scale 38C to the third riser 18C; attaching the fourth scale 38D to the fourth riser 18D; attaching the fifth and sixth scales 74A, 74B along laterally opposing sides of the dyno cart 12; and attaching the seventh and eighth scales 74C, 74D along longitudinally opposing sides of the dyno cart 12 (FIG. 1).

Once all of the scales are attached to their corresponding portions of the laser carting cell 10, the lasers 40A-40D are thereafter calibrated to ensure that measurements taken relative to the risers 18A-18D (e.g., along riser scales 38A-38D) coincide with measurements taken relative to the dyno cart 12 (e.g., along cart scales 74A-74D). To do so, each laser 40A-40D, for example, is activated (turned on) and, one by one, each height gauge assembly 28 is rotated until a laser beam emitted from each laser 40A-40D (illustrated with hidden lines 90A, 90B, 90C and 90D in FIG. 1) crosses its corresponding scale at the same relative point that it crosses a cart scales parallel thereto. In other words, the first laser 40A is oriented relative to riser 18A such that laser beam 90A emitted therefrom crosses the first riser scale 38A, the first and second cart scales 74A, 74B at the same measurement point (e.g., at 70 cm). As another example, the third laser 40C is oriented relative to riser 18C such that laser beam 90C emitted therefrom crosses the third riser scale 38C, the third and fourth cart scales 74C, 74D at the same measurement point (e.g., at 70 cm). This process is repeated for each laser 70A-70D, making any essential adjustments to the dyno cart 12, lasers 40A-40D, and scales 74A-74D, until the lasers are properly calibrated. At that point, the height gauge assemblies 28 are then tightened down (e.g., via bolts) to the height gauge adaptors 26A-26D.

Finally, an absolute zero height position is established for the lasers 40A-40D. This can be accomplished, for example, by providing a height standard (not shown) with a single, vertical reference point. The travel cars 22A-22D and height gauge assemblies are then adjusted until the laser beams 90A-90D emitted from each laser 40A-40D cross the vertical reference point. Subsequently, the electronic gauge with digital readout 30 is "zeroed out"—i.e., set to absolute zero.

The method 100 also includes, as step 111, setting up the dyno cart 12 to receive the property 50. In order to setup the dyno cart 12, the number of cross beams 62, and the number and type of support elements (e.g., stanchions 70A-70D) and engine mounts 72 must be determined. As explained above, all of this information is generated in step 101. Thus, using the cart scales 74A-74D, the cross beams 62 are positioned at their predetermined locations along the base plate 52, and attached to the cart side rails 64, 66 in a rigid manner (e.g., via T-bolts 68).

Contemporaneously therewith, each of the support elements (e.g., stanchions 70A-70D) are set to a predetermined height, also as part of step 111. The height of each stanchion 70A-70D is established in step 101, as part of the predetermined optimal alignment dimensions. Using the cart scales 74A-74D, the pre-set stanchions 70A-70D are attached to one of the cross beams 62 at predetermined locations, also based upon the predetermined optimal alignment dimensions determined in step 101. Finally, an engine mount 72 is attached to each of the support elements based upon a set of predetermined offset dimensions (e.g., offset relative to the stanchions 70A-70D).

Once the dyno cart 12 is properly setup (step 111), the property 50 is mounted, in step 113, to the dyno cart 12. To mount the property 50 to the dyno cart 12, the property 50 is preferably positioned such that it is generally vertically adjacent to the support elements (e.g., via a hoist or overhead crane). The property 50 is then oriented relative to the dyno cart 12 according to the predetermined optimal alignment dimensions (i.e., ensuring a proper fit and orientation). Finally, the property 50 is slowly lowered, and rigidly secured to the engine mounts 72.

The method 100 of the present invention reduces the effort and inefficiencies of current carting processes by utilizing the laser based carting cell 10 to scan features of the property 50 with the lasers 40A-40D to indicate proper alignment. To this regard, step 115 includes orienting the lasers 40A-40D based upon the math data (or predetermined optimal alignment dimensions) acquired in step 101. It is by this means that the laser 40A-40D provide a set of target locations (depicted in FIG. 1, for explanatory purposes, as elements 92A-92D). The carted property can be then adjusted (e.g., by individually or collectively modifying the heights of the stanchions 70A-70B, and/or the positions of the cross beams 62 and stanchions 70A-70B) so that predetermined locations of the property 50 align with the set of target locations, thereby ensuring that the property 50 is properly orientated during testing. For example, it may be determined that target location 92A represents where a particular fluid distribution port (e.g., for providing engine oil) is located in the dynamometer cell. Accordingly, as part of step 117, the property 50 can be meticulously adjusted in a timely and efficient manner to ensure that the proper fluid inlet in the property 50 aligns with the fluid distribution port in the dynamometer cell (as represented by target location 92A).

Once the property 50 is accurately aligned, and properly carted, the dyno cart is removed from the cart receiving station 14—i.e., disengaging locking mechanism 88, rotating the center lever 86 back to its original, inactive position, and removing the dyno cart 12 from the bed plate 80.

While the best modes for carrying out the present invention have been described in detail, those familiar with the art to which this invention relates will recognize various alternative designs and embodiments for practicing the invention within the scope of the appended claims.

The invention claimed is:

1. A method of aligning a property for testing in a dynamometer cell, the property having predetermined optimal alignment dimensions, the property defined at least in part by at least one of a motor, engine, and transmission, the method comprising:
    orienting at least two lasers based at least in part upon the predetermined optimal alignment dimensions to thereby provide a set of target locations;
    orienting the property such that predetermined locations of the property align with said set of target locations to ensure appropriate property orientation during testing;
    mounting at least two laser travel cars in a repositionable manner;
    mounting a respective one of said at least two lasers to each of said at least two laser travel cars in a repositionable manner;
    calibrating said at least two lasers;
    securing a dyno cart into a cart receiving station;
    preparing said dyno cart to receive the property;
    mounting the property to said dyno cart; and
    removing said dyno cart from said cart receiving station for delivery to the dynamometer cell.

2. The method of claim 1, wherein said mounting at least two travel cars includes:
    attaching one of said at least two laser travel cars to a first riser; and
    attaching the other of said at least two laser travel cars to a second riser, said second riser being generally perpendicularly oriented with respect to said first riser.

3. The method of claim 2, wherein said orienting at least two lasers includes:
    positioning said respective one of said lasers mounted to said first riser at a first position such that a laser beam emitted therefrom creates a first target point; and
    positioning said respective one of said lasers mounted to said second riser at a second position such that a laser beam emitted therefrom creates a second target point;
    wherein said set of target locations is defined at least in part by said first and second target points.

4. The method of claim 3, wherein said mounting a respective one of said at least two lasers to each of said at least two laser travel cars includes:
    attaching a height gauge to each of said at least two laser travel cars in a repositionable manner;
    mounting a laser adapter to each of said height gauges; and
    attaching a respective one of said lasers to each of said laser adapters.

5. The method of claim 4, wherein said calibrating said at least two lasers includes:
    attaching a first scale having opposing ends to said first riser;
    attaching a second scale having opposing ends to said dyno cart substantially parallel to said first scale; and
    orienting said respective one of said lasers mounted to said first riser such that a laser beam emitted therefrom crosses said first scale at a first point and said second scale at a second point, said first and second points being at equal distances from respective ends of said first and second scales.

6. The method of claim 5, wherein said calibrating said at least two lasers further includes:
attaching a third scale having opposing ends to said second riser;
attaching a fourth scale opposing ends to said dyno cart substantially parallel to said third scale;
orienting said respective one of said lasers mounted to said second riser such that a laser beam emitted therefrom crosses said third scale at a third point and said fourth scale at a fourth point, said third and fourth points being at equal distances from respective ends of said third and fourth scales.

7. The method of claim 6, wherein said calibrating said at least two lasers further includes:
establishing an absolute zero height position for said at least two lasers.

8. The method of claim 7, wherein said preparing said dyno cart to receive the property includes:
attaching at least one cross beam to said dyno cart based at least in part upon the predetermined optimal alignment dimensions.

9. The method of claim 8, wherein said preparing said dyno cart to receive the property further includes:
setting at least one support element to a predetermined height based at least in part upon the predetermined optimal alignment dimensions; and
attaching said at least one support element to said at least one cross beam based at least in part upon the predetermined optimal alignment dimensions.

10. The method of claim 9, wherein said preparing said dyno cart to receive the property further includes:
attaching an engine mount to each of said at least one support elements based at least in part upon the predetermined optimal alignment dimensions.

11. The method of claim 10, wherein said mounting the property to said dyno cart includes:
positioning the property such that it is generally vertically adjacent to said at least one support element;
orienting the property relative to said dyno cart based at least in part upon the predetermined optimal alignment dimensions; and
mounting said property to said engine mount.

12. The method of claim 11, wherein said receiving station includes a receiving portion that is substantially similar to a receiving portion inside the dynamometer cell that is configured to mate with, receive, and secure said dyno cart.

13. A method of carting a property for testing in a dynamometer cell, the property having predetermined optimal alignment dimensions, the property defined at least in part by at least one of a motor, engine, and transmission, the method comprising:
mounting a plurality of laser travel cars in a repositionable manner;
mounting at least one of a plurality of lasers to each of said plurality of laser travel cars in a repositionable manner;
securing a dyno cart into a cart receiving station;
calibrating said plurality of lasers;
preparing said dyno cart to receive the property;
mounting the property to said dyno cart;
orienting said plurality of lasers based at least in part upon the predetermined optimal alignment dimensions to thereby provide a set of target locations; and
orienting the property such that predetermined locations of the property align with said set of target locations to ensure appropriate property orientation during testing.

14. The method of claim 13, wherein said mounting a plurality of travel cars includes:
attaching a first of said plurality of laser travel cars to a first riser;
attaching a second of said plurality of laser travel cars to a second riser;
attaching a third of said plurality of laser travel cars to a third riser; and
attaching a fourth of said plurality of laser travel cars to a fourth riser;
wherein said first, second, third and fourth risers are positioned to thereby create a four-sided envelope therebetween.

15. The method of claim 14, wherein said orienting said plurality of lasers includes:
positioning a first of said plurality of lasers at a first position relative to said first riser such that a laser beam emitted therefrom creates a first target point;
positioning a second of said plurality of lasers at a second position relative to said second riser such that a laser beam emitted therefrom creates a second target point;
positioning a third of said plurality of lasers at a third position relative to said third riser such that a laser beam emitted therefrom creates a third target point; and
positioning a fourth of said plurality of lasers at a fourth position relative to said fourth riser such that a laser beam emitted therefrom creates a fourth target point;
wherein said set of target locations is defined at least in part by said first, second, third and fourth target points.

16. The method of claim 15, wherein said calibrating said plurality of lasers includes:
attaching a first scale having opposing ends to said first riser;
attaching a second scale having opposing ends to said second riser;
attaching a third scale having opposing ends to said third riser;
attaching a fourth scale having opposing ends to said fourth riser;
attaching fifth and sixth scales each having opposing ends at laterally opposing sides of said dyno cart, and seventh and eighth scales each having opposing ends at longitudinally opposing sides of said dyno cart;
orienting each of said first and second lasers such that a laser beam emitted therefrom crosses a respective one of said scales and said fifth and sixth scales at a respective point, said respective points being at equal distances from respective ends thereof; and
orienting each of said third and fourth lasers such that a laser beam emitted therefrom crosses a respective one of said scales and said seventh and eighth scales at a respective point, said respective points being at equal distances from respective ends thereof.

17. The method of claim 16, wherein said preparing said dyno cart to receive the property includes:
attaching at least one cross beam to said dyno cart based at least in part upon the predetermined optimal alignment dimensions;
setting at least one support element to a predetermined height based at least in part upon the predetermined optimal alignment dimensions;
attaching said at least one support element to said at least one cross beam based at least in part upon the predetermined optimal alignment dimensions; and attaching an engine mount to each of said at least one support elements based at least in part upon the predetermined optimal alignment dimensions.

18. The method of claim 17, wherein said mounting the property to said dyno cart includes:

positioning the property such that it is generally vertically adjacent to said at least one support element;

orienting the property relative to said dyno cart based at least in part upon the predetermined optimal alignment dimensions; and mounting said property to said engine mount.

\* \* \* \* \*